United States Patent [19]

Sokoloski

[11] Patent Number: 5,671,709
[45] Date of Patent: Sep. 30, 1997

[54] INTAKE PORT

[75] Inventor: Rodney Sokoloski, Los Angeles, Calif.

[73] Assignee: Edelbrock Corporation, Torrance, Calif.

[21] Appl. No.: 655,466

[22] Filed: May 30, 1996

Related U.S. Application Data

[62] Division of Ser. No. 437,376, May 9, 1995.

[51] Int. Cl.⁶ .................................................. F02B 23/08
[52] U.S. Cl. .................................................. 123/193.5
[58] Field of Search .......................... 123/193.5, 193.3, 123/306, 657, 432, 308

[56] References Cited

U.S. PATENT DOCUMENTS

| | | | |
|---|---|---|---|
| 2,318,914 | 5/1943 | Anderson et al. | 123/193.5 |
| 4,524,732 | 6/1985 | Dworak et al. | 123/193.5 |
| 4,545,101 | 10/1985 | Hilts | 123/193.5 |
| 4,919,092 | 4/1990 | Smith et al. | 123/193.5 |
| 5,042,440 | 8/1991 | Joseph | 123/193.5 |
| 5,138,990 | 8/1992 | Smith et al. | 123/193.5 |

Primary Examiner—Marguerite McMahon
Attorney, Agent, or Firm—Ronald M. Goldman

[57] ABSTRACT

The cylinder head for a twin V-twin motorcycle engine contains an intake port entrance lies in a plane oriented at an angle of less than ninety degrees to another plane defined by the center lines to the intake and exhaust valve guides and the entrance is characterized by a rectangular shape that is tilted from the horizontal plane of the head so that one of the three corners to the rectangular shape is lower in vertical position than the other three. The floor, the lower side between the two lower most corners, is oriented perpendicular to the intake valve guide.

1 Claim, 4 Drawing Sheets

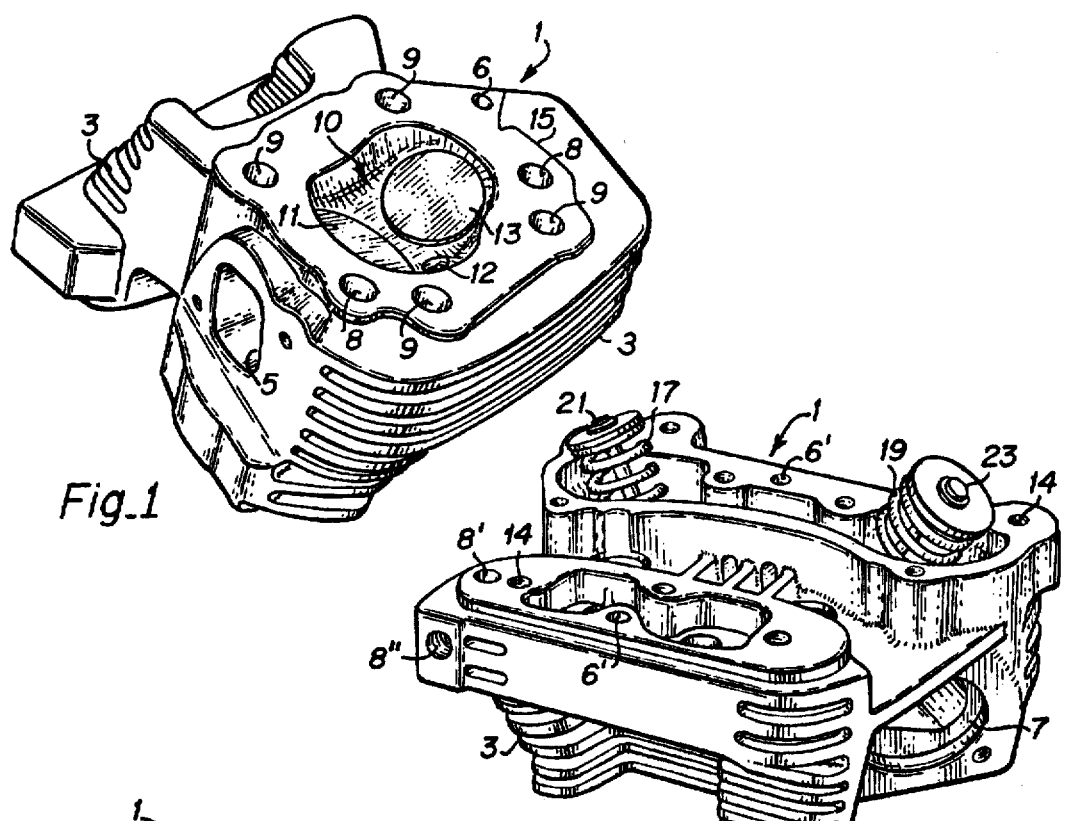
Fig. 1
Fig. 2
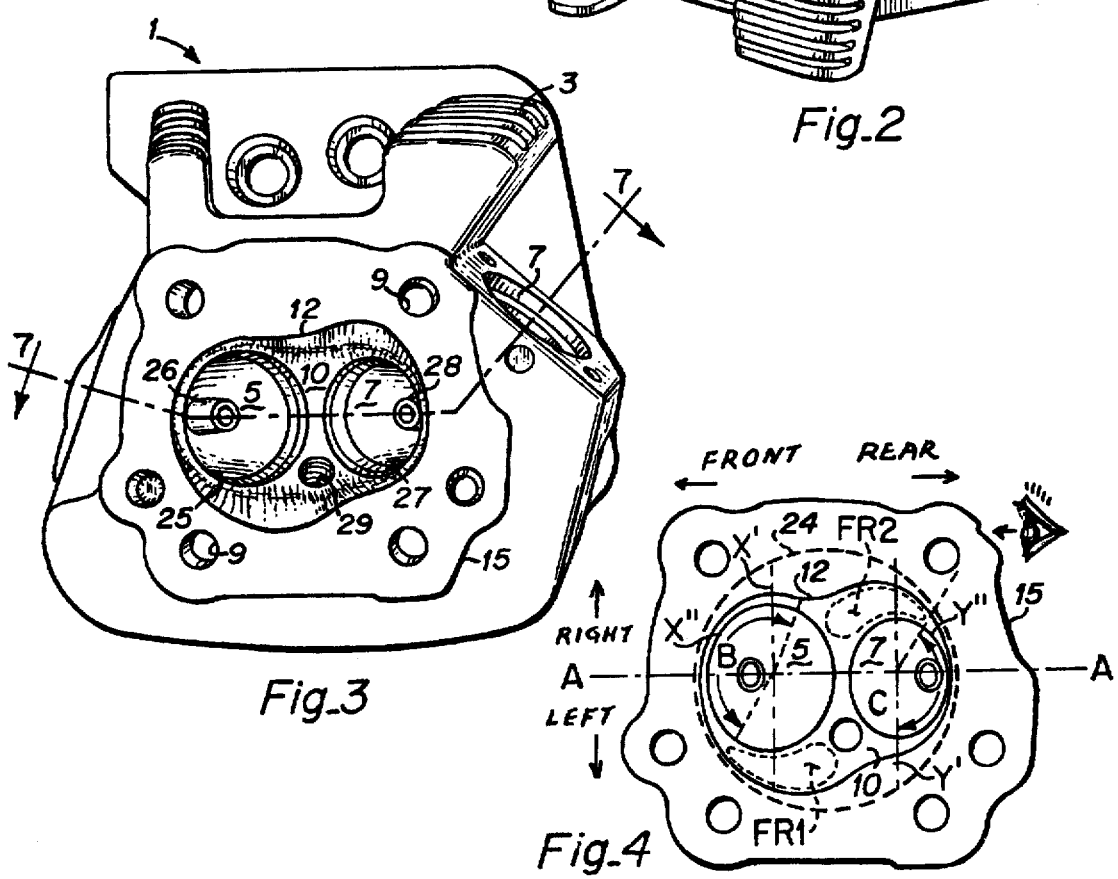
Fig. 3
Fig. 4

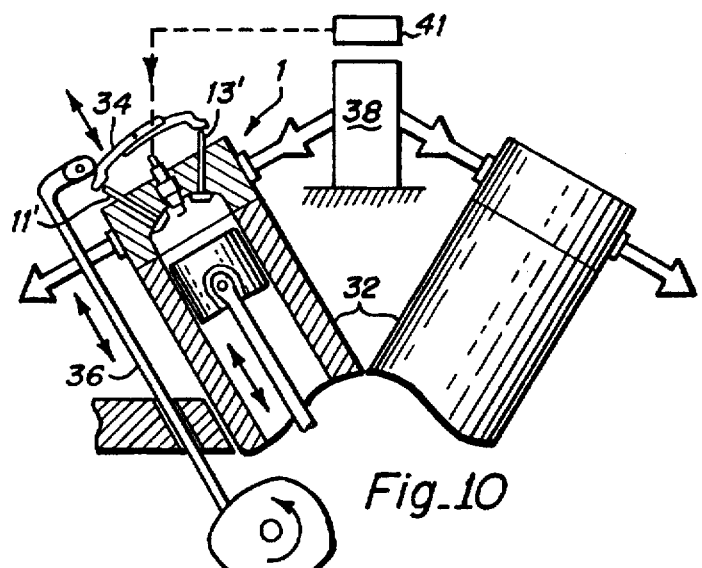
Fig._10
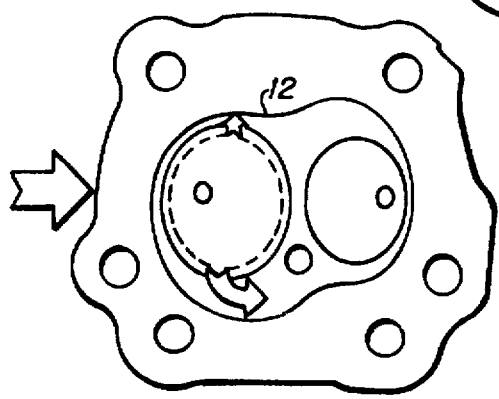
Fig._11A
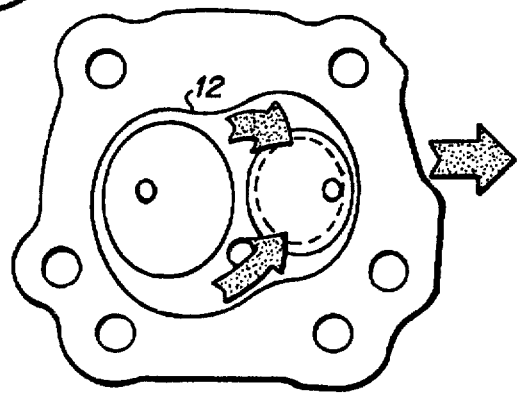
Fig._11B
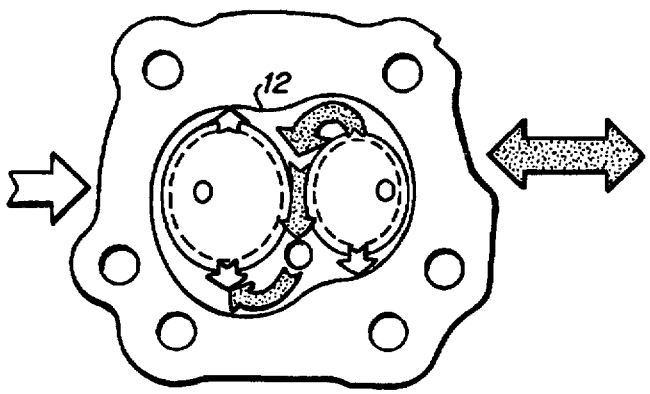
Fig._11C
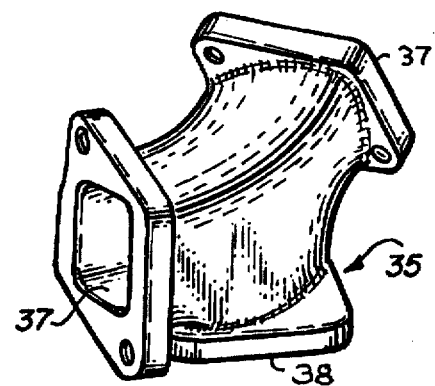
Fig._12

INTAKE PORT

The present application is a division of application Ser. No. 08/437,376 filed May 9, 1995. Applicant claims the benefit under Title 35, United States Code, Sec. 120 of the aforerecited United States application.

FIELD OF THE INVENTION

This invention relates to internal combustion engines, and, more particularly, to an intake port for use with an improved cylinder head for a four stroke motorcycle engine.

BACKGROUND

Motorcycles manufactured by the Harley Davidson Motorcycle Company have achieved a celebrity status, acquiring a loyal following among motorcycle enthusiasts. Many of those enthusiasts customize their "Harley", placing their personal touch on the classic bike delivered by the manufacturer, whether by adding special paint, designs, chrome plating, accessories, and upgrading stock components with aftermarket equipment, acquired from the Harley Davidson Company or from independent equipment designers. Most such additions are intended to improve engine performance. The present invention also offers an aftermarket product that also addresses improving engine performance.

The internal combustion engine used in the Harley Davidson motorcycle in more recent years is a four stroke V-twin engine, referred to as the Evolution engine. That engine contains two cylinders and operates on the four stroke cycle of operation. Each engine cylinder contains a top portion, referred to as the cylinder head or simply as the head, containing the valves and associated inlet and exhaust ports and an internal cavity, the combustion chamber. As assembled, the head attaches atop the main cylinder containing the cylinder and piston, oriented with the combustion chamber aligned over the cylinder so as to complete the engine cylinder. In the stock Evolution big V-Twin engine, the combustion chamber is essentially hemispherical in shape, and is bordered by a straight side. The present invention in part addresses the cylinder head and, among other aspects, defines a combustion chamber of novel geometry.

Others earlier discovered that cylinder heads in stock Evolution engines incur considerable exhaust gas reversion during engine operation. As those skilled in the art understand, reversion refers to the movement of exhaust gases in the reverse direction, back up through the intake flow path. That effect essentially robs the engine of power that would otherwise be available from the charge of fuel. It is appreciated that internal combustion engines are designed to move gasoline vapors in one direction, through the intake as an air-fuel mixture, into the combustion chamber and, following combustion, from the combustion chamber as exhaust gases out the exhaust port. When instead exhaust gas reenters the combustion chamber and pollutes the air-fuel mixture, the nature of the combustible mixture is altered. The potential power of combustion that would otherwise be obtained from the fuel in the internal combustion process is reduced.

Many aftermarket designed replacement cylinder heads have been marketed as an upgrade to improve Evolution engine performance. A discussion of a variety of cylinder head designs offered by various companies to motorcyclists appears in an article entitled "Head Games" appearing at pages 55 through 59 of the January 1995 issue of *Hot Rod Bikes* magazine, Vol. 2, No. 1, which should be reviewed for possible background interest. It should be noted that the article was published subsequent to the present invention as that article includes the author's comment on the present invention as well.

One of those cylinder head designs, identified as the Gerolamy design, contains an enlarged combustion chamber and an enlarged intake port in which a side of the chamber wall is extended laterally away from the intake and exhaust ports a greater distance than the opposite chamber side to those ports. Although applicant does not know the theory behind the foregoing design, applicant believes the purpose underlying the design, like the others, is to increase turbulence of gases in the combustion chamber.

Accordingly, a principal object of the invention is to improve the four stroke engine, particularly to increase the level of power output and torque available from a given four stroke engine.

Another object of the invention is to reduce reversion of exhaust gases in internal combustion engines and thereby improve the efficiency of the engines' internal combustion.

A further object of the invention is to improve the performance of the Evolution V-Twin engine with a replacement cylinder head that reduces exhaust gas reversion to replace the cylinder head originally supplied with the engine.

An additional object of the invention is to provide a new design for an intake port for use with a cylinder head for a four stroke motorcycle engine.

And still another object of the invention is to provide a new and improved motorcycle engine.

SUMMARY OF THE INVENTION

In accordance with the foregoing, an engine's cylinder head includes a combustion chamber with the chamber's intake and exhaust ports located spaced apart between the combustion chamber's front and back ends. The chamber incorporates two flow relief regions, one for each of the ports, that are located on opposite right and left sides of the chamber, and flow resist regions about the remaining portions of the respective port's periphery, obstructing gas flow into the flow resist regions. The foregoing arrangement defines a gas reversion path from the exhaust port that zig-zags through the chamber to the intake port. In as much as a zig-zag path between the two ports is of greater length than a straight path, the novel design obstructs, thus delaying, gas reversion. With reduction of exhaust gas reversion, greater torque and power is achieved during engine operation.

More particularly, a portion of the periphery of the intake port is situated close to an upstanding portion of the cavity wall, essentially shrouding that peripheral portion. The cavity wall shrouds a portion of the intake port located generally to the right side of the chamber, leaving an unshrouded region, defining one flow relief area, located to the left side of the chamber, but not so close to the cavity wall. A portion of the periphery of the exhaust port is situated close to another upstanding portion of the cavity wall, that essentially shrouds that peripheral portion to define a flow resist area. The cavity wall shrouds a portion of the exhaust port on the left side of the chamber, leaving an unshrouded region, defining a second flow relief area, located to the right side of the chamber. With the intake and exhaust valves in place controlling the opening of the respective ports, during the period of valve overlap when both ports are simultaneously slightly open, any backflowing exhaust gas, thus, must move from the exhaust port through the flow relief area to one side of the combustion chamber. From there such exhaust gas reaches the middle section of the combustion chamber and crosses over to the other side, and then passes through the other flow relief area before reaching the intake port.

In accordance with an additional aspect of the invention the exterior entrance to the intake port defines a rectangular geometry and lies in a plane that is somewhat off perpendicular to another plane through the cylinder head valve guides. The rectangular entrance is oriented tilted up, wherein one of the four corners is lower than the others, whereby the air-fuel intake valve guide appears centered in the port entrance. The exterior exit to the exhaust port defines a D-shaped geometry, in which the straight or flat portion of the D serves as the floor to the exhaust port.

The foregoing and additional objects and advantages of the invention together with the structure characteristic thereof, which was only briefly summarized in the foregoing passages, and additional structure therefor, becomes more apparent to those skilled in the art upon reading the detailed description of a preferred embodiment, which follows in this specification, taken together with the illustrations thereof presented in the accompanying drawings.

BRIEF DESCRIPTION OF THE DRAWINGS

In the Drawings:

FIG. 1 is a bottom perspective view of the cylinder head with intake and exhaust valves installed;

FIG. 2 is a top perspective view of the cylinder head of FIG. 1, rotated by ninety degrees counter clockwise from that illustrated in FIG. 1 and inverted;

FIG. 3 is a bottom view of the cylinder head of FIG. 1, showing the combustion chamber with the intake and exhaust valves omitted and the relationship between the valve ports and combustion chamber walls;

FIG. 4 is a pictorial plan view of the combustion chamber of FIG. 3 used in connection with a discussion of the combustion chambers features;

FIG. 10 is a pictorial view of the cylinder head as assembled in place as part of a Twin-V engine;

FIGS. 11A, 11B and 11C are additional pictorial views of FIG. 4 useful in the discussion of operation of the cylinder head; and FIG. 12 is a perspective view of a novel intake manifold that is used with the cylinder head.

DESCRIPTION OF THE PREFERRED EMBODIMENTS

Figure 5A:
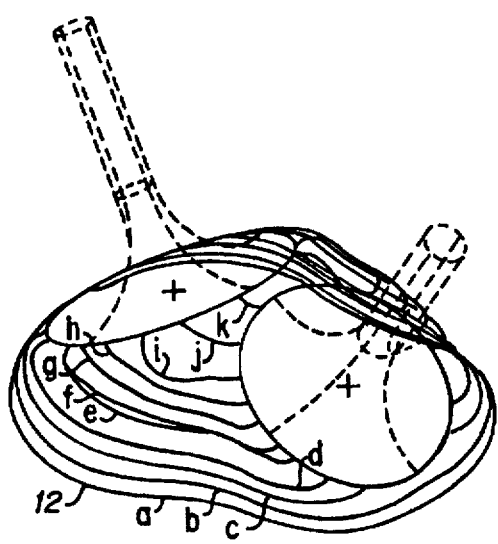
FIGS. 5A and 5B illustrate, respectively, in perspective and top plan views, contour lines evenly spaced along the height of the combustion chamber of FIG. 3, illustrating the combustion chamber geometry in greater detail.

Reference is made to the specific embodiment of the invention presented in FIGS. 1 and 2, which may be inspected together. FIG. 1 illustrates an embodiment of the improved cylinder head 1 in a bottom perspective view with valves assembled in place and FIG. 2 illustrates the head of FIG. 1 in a top perspective view with the latter FIG. 2 being obtained by inverting the view of the cylinder head in FIG. 1 and rotating the head clockwise by ninety degrees. As here illustrated, the head includes conventional air cooling fins 3 to dissipate heat generated in the head during operation, an air-fuel inlet port 5, sometimes referred to simply as the intake port, and an exhaust port 7. Oil passages 8, which pass lubricating oil through the head to lubricate the engine components that are to be mounted on the top of the head, such as the valve train components, not illustrated, and the valve stems. It is noted that while two such oil passages 8 are shown, only one passage is used in this head and the other is blocked. In the complementary head for the engine, later herein discussed, the opposite passage 8 is blocked, while the other is open. Four cylindrical bolt receiving passages 9, called through-holes, are included for the cylinder head bolts that affix the head to the main cylinder. And a tooling point location hole 6 is included for manufacturing convenience.

Combustion chamber 10, a cavity recessed from the bottom surface of the cylinder head, is visible in the bottom view of FIG. 1, the details of which are discussed at greater length in connection with the subsequent illustrations herein. An intake valve 11 and an exhaust valve 13 are shown seated in the respective ends of the associated valve ports 5 and 7, visible in FIG. 3, that open into the combustion chamber. The valves and the respective ports are located at spaced positions within the combustion chamber.

As shown, the combustion chamber is open and terminates at the bottom of the head at the entrance or window boundary perimeter 12. The combustion chamber does not undercut the boundary 12 and is essentially coterminus therewith. A flat machined flange surface 15 surrounds the entrance to the combustion chamber. The flange surface is intended to mate with a like flange surface on the main cylinder of the engine, not illustrated, either with or without a conventional gasket, as appropriate, positioned intermediate the two engine components.

Valve springs 17 and 19, shown slightly compressed, are partially illustrated in FIG. 2. The valve stems 21 and 23, shafts attached to the reverse side of the respective valve faces 11 and 13 shown in FIG. 1, are mounted for reciprocal movement in the cylinder head. Valve springs are compression springs that normally bias or force the associated valve stems axially outwardly, thereby normally pressing the respective valve faces against the associated valve seat in the combustion chamber, as was illustrated in FIG. 1, closing the associated port or, as otherwise stated, closing the valve. In an assembled engine, the valves are actuated by the valve train, not illustrated, comprising-tapets, push rod, rocker arm, and valve stem. The valve stem moves, carrying its integrally formed valve face away from its respective seat in the combustion chamber at an appropriate period during the engine cycle, further compressing the spring, opening the associated port or, as otherwise stated, opening the valve. The foregoing valve structure is entirely conventional.

The conventional metal rocker box cover, which fits over the top of and fastens to the cylinder head to cover the valve springs and other components conventionally mounted on the cylinder head is omitted to better illustrate the cylinder head structure. Two additional tooling point location holes 6' are visible in the view of FIG. 2. An additional oil passage 8' which interconnects to a threaded passage 8" provides a conduit to ventilate the top of the rocker box into the positive crankcase ventilation, PCV, provision found on the engines carburetor, a conventional emissions requirement. A plurality of tapped holes 14, only two of which are labeled are provided for securing the rocker box and rocker arms, not illustrated, in place on the cylinder. The cylinder head is preferably formed of aluminum, suitably 356 aluminum in a conventional casting process and is treated to T6 hardness. The casting is then drilled and machined to required dimensional tolerances.

Reference is made to the bottom view of the cylinder head illustrated in FIG. 3. For better understanding, the air-fuel intake valve 11 and exhaust valve 13 are omitted. As shown, the air-inlet port 5, to the left in the figure or "front" side of chamber 10, opens into combustion chamber 10 through the top wall of the chamber and is circular in shape at this location. A valve seat 25 is seated within the port and is machined to a smoothly curved shape. The exhaust port 7, to the right in the figure or "rear" side of chamber 10, also opens into the combustion chamber 10 through the top wall of the combustion chamber and is circular in shape and of a slightly smaller diameter than the intake port. A valve seat 27 is seated within the exhaust port and is machined to a smoothly curved shape. Conventional valve guides 26 and 28, cylindrical tubes, are centrally located in the respective intake and exhaust ports. The valve guides serve to support and guide the respective valve stems, not illustrated, an element of the respective valves 11 and 13, earlier illustrated in FIGS. 1 and 2, allowing the valves to be reciprocated back and forth during the operation of the engine.

In this view the face or exterior entrance to air-inlet port 5, illustrated in FIG. 1, lies in the flat exterior surface that is represented by the straight line shown to the left in the figure that slopes downward and outward and extends across the left portion of line 7—7. Because that exterior surface is oriented perpendicular to the plane of the sheet, the air-inlet port's exterior entrance is not otherwise visible in this figure.

A tapped threaded hole 29, located in the rear of the head between ports 5 and 7 and to one side of those ports, provides the mounting for a threaded spark plug, not illustrated. When assembled, a conventional spark plug is screwed into place in hole 29 from the opposed side of the cylinder head into the opening and properly torqued, leaving the spark plug's tip end protruding into combustion chamber 10. That permits the electric spark generated by the engine's electrical ignition system to apply a high voltage to the spark plug, creating the electric spark at the plug's tip at appropriate times during the engine operation. The spark ignites the air fuel mixture introduced into the chamber, causing combustion.

Boundary 12 to the chamber is seen to define a curvaceous figure or window, as variously termed, that is of an asymmetric shape. If one visualizes a plane AA, oriented perpendicular to the drawing figure of FIG. 3, drawn through the axis of both intake and exhaust ports in FIG. 3, as a reference, circular shaped port 5 is located in the cavity with its side or periphery to the right side of the plane, as viewed from the right of the figure, such as at x' in the pictorial illustration of FIG. 4, to which reference is made, located very close to the cavity wall. At that location the cavity wall is almost upstanding, vertical, in orientation. The cavity wall is said to "shroud" the port at those locations, creating a "flow resist" region. A substantial portion of the periphery of port 5 is shrouded, extending over an extension of periphery of angle B, which is about 160 degrees in the practical embodiment illustrated. To the left side of port 5 and to the left side of plane AA' the cavity wall curves around more gradually from the port up to the boundary 12 and is more spaced from the left side of the intake port, as shown at x", diametrically opposite in position from x'. The wall does not shroud this latter side of the intake port. This leaves a volumetric region FR1 in the combustion chamber located principally to the left side of the intake port that is referred to as the "flow relief" region.

When the disc shaped intake valve is unseated from the intake port and axially moved into the chamber during engine operation, the disk shaped valve is axially moved to a position spaced in front of the cylindrical shaped intake port, leaving an annular shaped opening between the valve face and the intake port. Through that annular opening, the air-fuel mixture, enters the combustion chamber. As those familiar with gas flow appreciate, the gas flows from the higher atmospheric pressure to the region of lower pressure via the path of least resistance. With the cavity wall located very close to a portion of the periphery of the intake port and the shape of the wall rising steeply, an effective barrier, screen or shroud as variously termed, is thereby formed to the flow of gas in that direction, restricting or inhibiting such flow. That is, the gas moving against the adjacent steep wall creates a high pressure in that region. Hence, the term flow resist region. On the other hand, along those other portions of the intake port periphery, at which locations the cavity wall is spaced at a greater distance and rises in a more gradual manner, relatively substantially less restriction or inhibition to gas flow is created. The cavity wall thus does not shroud those other peripheral portions, leaving them unshrouded. Hence, in contrast to the flow resist region about the shrouded peripheral portion of the valve port, the unshrouded portion, in a comparative sense, gives relief to the gas, hence the term, flow relief region. Presented with those physical characteristics, during engine operation, the gas takes the path of least resistance, which is to the flow relief region. The foregoing principles are applicable, whether a gas is flowing out of a valve or into a valve, as in the case of an exhaust port, next considered.

Exhaust port 7, circular in shape at the chamber wall, is likewise located in the cavity with its side or periphery to the left side of the plane, such as at y' in the pictorial illustration of FIG. 4, located very close to the cavity wall. At that location the cavity wall is almost upstanding, vertical, in orientation. The cavity wall is said to "shroud" the port at this location and other locations along the periphery of the port, extending counterclockwise over an angle C, which is about 140 degrees in the practical embodiment illustrated. A substantial portion of the periphery of port 7 is thus shrouded. To the right side of port 7 and to the right side of plane AA the cavity wall curves around more gradually from the port up to the boundary 12 and is more spaced from the right side of the exhaust port 7, as shown at y", essentially diametrically opposite in position from y'. The combustion chamber wall does not shroud this latter side of the intake port. This defines a volumetric region FR2 within the combustion chamber to the right side of exhaust port 7, also referred to as a flow relief region. With the assistance of the pictorial view of FIG. 4, one may again reference FIG. 3, and observe those same regions, even though unlabeled.

There appears no necessity for a clear demarcation between the flow relief regions and the shrouded regions. The transition between those regions, thus, is gradual to avoid creating low pressure and high pressure pockets in and about the circumference of the chamber. In the illustrated embodiment, it may be said that approximately 140 degrees of the exhaust port periphery 7 is shrouded and the remaining 220 degrees of the periphery is open to the flow relief area. Of the latter, as shown, the approximately 90 degrees, next to the end of the shrouded region, defines the flow relief region. So too for the air-fuel inlet port 5. It may be said that approximately 160 degrees of the intake port periphery is shrouded by the combustion chamber wall. The remaining portion of the periphery, 200 degrees, is open to the flow relief area associated with that port or, as alternatively stated, is unshrouded. Of the latter, as shown, approximately 90 degrees contiguous to an end of the shrouded region, defines the respective flow relief region.

The inclusion of the two flow path relief areas, FR1 and FR2, on essentially diagonally opposite sides of the combustion chamber, results in a perimeter 12 that defines an asymmetrical figure, that resembles the silouhete of the torso of a slightly lopsided snowman. The asymmetry is principally due to the fact that the intake port 5 is larger in diameter than exhaust port 7, as are the corresponding valves, so as to produce a larger outward bulge to chamber 10 for that flow path relief area, as viewed in the lower left side of FIGS. 3 and 4. Were, however, one to design a cylinder head in which the intake and exhaust ports were equal in diameter, it is recognized that the perimeter of that combustion chamber, corresponding to perimeter 12, would instead be symmetrical in shape, analogous to the silhouette of a snowman's torso. Since the practice in the field is to have the intake valve of greater size than the exhaust valve, the asymmetric design remains the preferred choice.

Figure 5B:
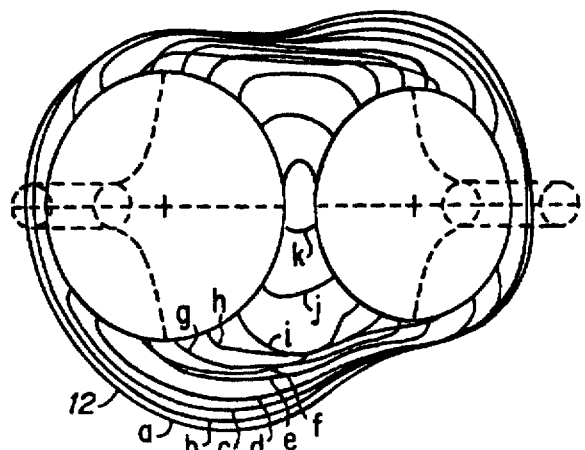

To further assist in the visualization of the combustion chamber configuration, FIGS. 5A and 5B present a topographical map of the combustion chamber formed by contour lines taken at ten different sections, labeled a through k, evenly spaced between the bottom of the chamber, window 12, to the top, a distance of 0.10 inches in the described practical embodiment. FIG. 5A presents the contour lines in perspective view and those in FIG. 5B are presented in top view. The foregoing better illustrates the geometry of a preferred combustion chamber. The close spacing of the contour lines show the location at which the chamber wall ascends more steeply. At the lower right the wall is located close to the exhaust valve port and rises steeply; at the upper right the wall is spaced further from the port, defining the flow relief area for the exhaust valve. The same relationship holds on the left end of FIG. 5B.

Figure 6A:
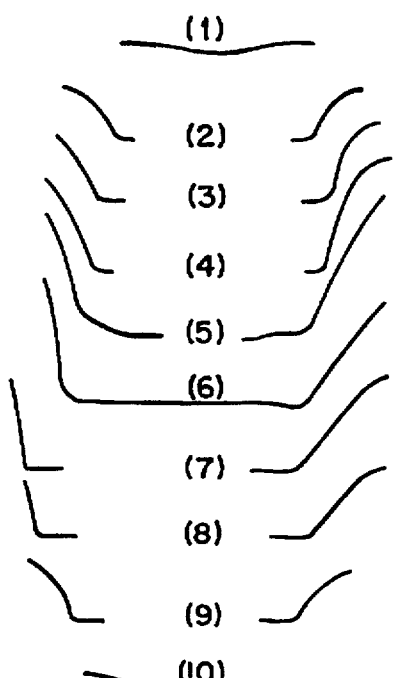
FIG. 6A is a series of profiles of the combustion chamber of FIG. 3, characterizing the shape of the cylinder head's combustion cylinder in greater detail and accompanying FIGS. 6B and 6C aid in understanding those profiles.
Figure 6B:
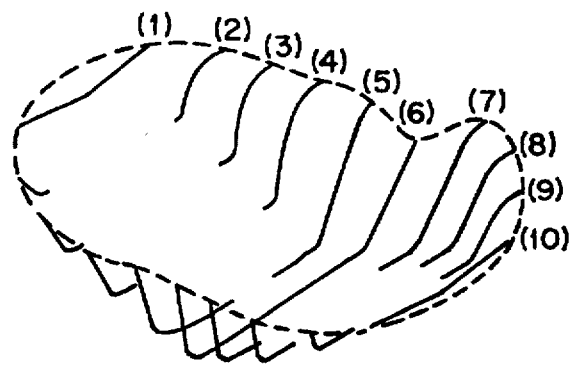
Figure 6C:
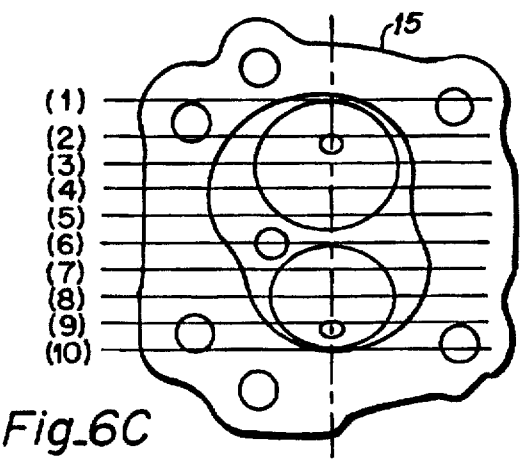

FIG. 6A presents ten profile lines of the combustion chamber labeled (1) through (10). These profiles are taken from front to back at essentially equal distances along plane AA' in the bottom view of FIG. 6C, perpendicular to that plane, a spacing of 0.35 inches between segments with an overall front to back distance of approximately 3.50 inches in the practical embodiment hereinafter described. The profile lines are collected together in the perspective view of FIG. 6B, in which the closed curve indicated in dash lines represents the periphery of the combustion chamber pictorially illustrated in FIG. 6C. It is appreciated that the blank spaces in the views of FIG. 6A and 6B represent the respective intersection of the profile lines with the void created by the intake port, located in the uppermost portion of the chamber in FIG. 6C, and that created by the exhaust port, located in the lowermost portion of the chamber illustrated in FIG. 6C, respectively. The profile lines also help to define the combustion chamber geometry for the specific embodiment illustrated. It is appreciated that contour and profile clearly quantify and define the shape of the combustion chamber with greater precision than otherwise and, together with the boundary, best defines the combustion chamber design for this preferred embodiment. As those skilled in the art appreciate from reading this specification, the invention is not limited to such specific geometry and other geometries may be substituted.

An outline of the main cylinder appears in dash lines 24 in FIG. 4 to which reference is again made. This outline illustrates the relationship of the cylinder head to the main cylinder when the cylinder head is assembled to the engine. As shown the circular outline of the cylinder surrounds the assymetric shaped combustion chamber and overlaps a portion of the flat bottom surface of the cylinder head in the region adjoining the combustion chamber. This is a known relationship that is intended to increase turbulence in the air fuel mixture during the compression cycle by "squishing" the gaseous mixture away from the flat surfaces and into the combustion chamber, creating a more homogenous mixture.

Figure 7:
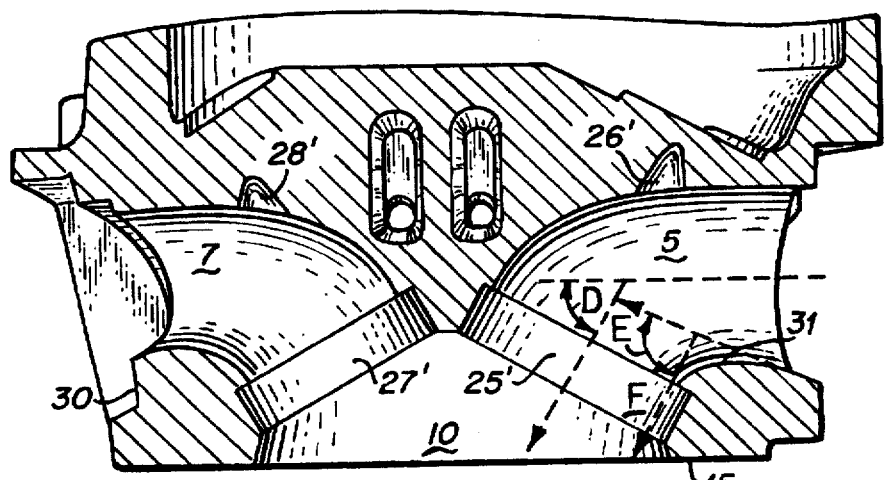
FIG. 7 is a section view taken along the lines 7—7 in FIG. 3 and inverted, further illustrating the combustion chamber and the intake and exhaust ports.

Reference is next made to the partial section view of FIG. 7, which is taken along the lines 7—7 in FIG. 3 with the section reversed in position. In this view the elements previously described are given the same labels that were used in the prior figures. This figure reverses the direction of view so that the intake port 5 is viewed on the right in the figure. It may be noted that valve seats 25 and 27 are omitted in this view, exposing the machined cylindrical regions 25' and 27' to which the respective valve seats are affixed, suitably a press fit. Valve guides 26 and 28 are also omitted, partially exposing the through holes 26' and 28' in which the respective valve guides are attached, suitably a press fit.

In this figure intake port 5 is better illustrated as a conduit that extends from an entrance at the exterior of the cylinder head to the top of chamber 10. Likewise exhaust port 7 is a conduit that extends from the top of the combustion chamber to an entrance at the exterior of the cylinder head. While each port appears of circular shape section at the combustion chamber, each conduit is of a different shape in section at the exterior end as hereinafter described in greater detail. The cross section shape of each conduit undergoes a transformation in shape between the shape at the entrance to the cylinder head and that circular shape at the combustion chamber.

Figure 8:
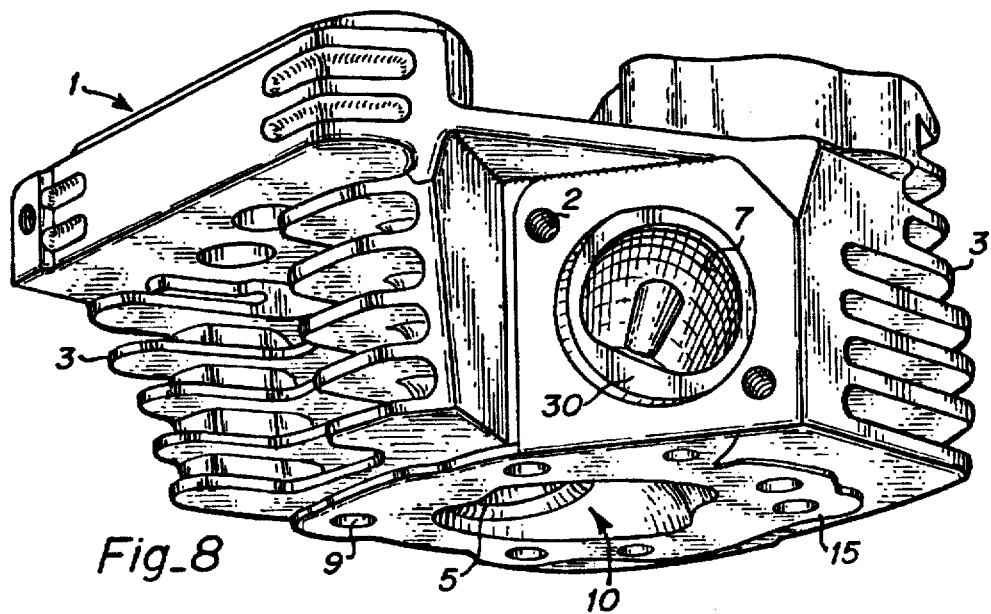
FIG. 8 is another perspective view of the cylinder head of FIG. 2 taken from a side thereof that better illustrates the shape of the exhaust port exit from the cylinder head.

Reference is made to the perspective view of FIG. 8, which presents the exhaust port 7 in front view. As illustrated, the port is of a D shape, with the straight portion of the D, located on the bottom side or "floor" of the port. The floor of the port if preferably oriented perpendicular to the exhaust valve axis, the latter of which extends through the valve stem guide that is visible through the port exit in FIG. 8. Two tapped holes 2 are located in the block to allow connection of the exhaust pipe flange, not illustrated, when the engine is assembled. The exhaust pipe is cylindrical in shape. The D shape to the exhaust port exit creates a short ledge or abuttment 30, underlying the straight section of the D, along the bottom of the cylindrical passage in the exhaust pipe. This abuttment is more clearly illustrated on the left end of FIG. 7, which is referred to temporarily. As is known, when mated to a cylindrical shaped exhaust pipe, the discontinuity presented by the straight floor, somewhat inhibits exhaust gas flow in the reverse direction into the engine. Though beneficial in disrupting and delaying reversion, the D-shape geometry to the exhaust structure does not entirely eliminate reversion.

Figure 9:
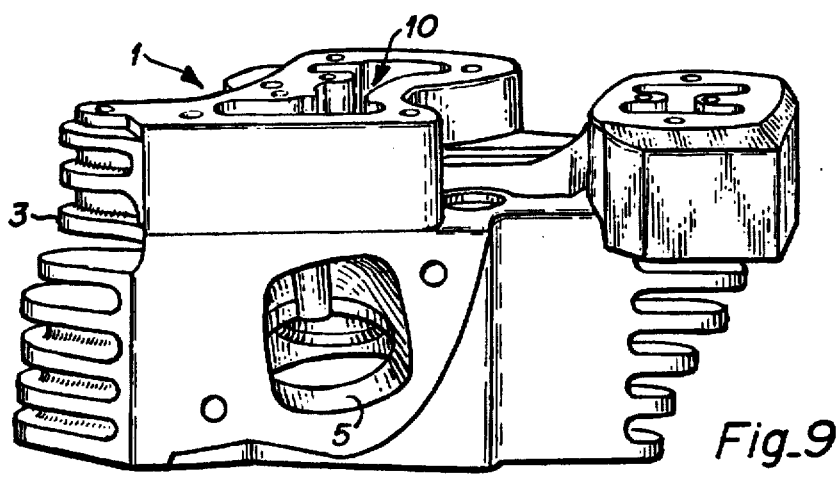
FIG. 9 is another perspective view of the cylinder head of FIG. 2 taken along a side thereof that shows the better illustrates shape of the inlet port entrance to the cylinder head.

As shown in the inverted side perspective view of FIG. 9, the entrance to the air-fuel intake is rectangular, almost square shaped, in section. In the transition that conduit changes in section to the circular shape illustrated in FIG. 4.

This intake is mated to the intake manifold, which is of like cross section shape, such as illustrated in FIG. 12, later discussed.

In a four stroke V-twin engine, the engine contains two cylinder heads, one located in front, referred to as the front head, and the other located at the rear, referred to as the rear head, as pictorially illustrated in FIG. 10. The foregoing embodiment illustrated is of the front cylinder head. In such an engine the carburetor is often located in the center of the V shaped assembly and so are the intake ports of the two cylinder heads. It should be appreciated that the relative location of the intake port and the exhaust port for the rear cylinder head, thus, is the reverse of that illustrated in the preceeding figures for the front cylinder head. And the combustion chamber is the reverse of that depicted in FIG. 3 with the chamber effectively rotated by 180 degrees from that illustrated in FIG. 3. Except for such reversal in position of the elements, the mode of operation of the cylinders is, notwithstanding, identical.

FIG. 10 is a pictorial diagram of a two cylinder big V-twin engine, with the principal elements of the front cylinder illustrated in section. As illustrated, with the valves, valve springs, rocker arms and stems assembled into place on the front cylinder head 1, the cylinder head is assembled to the top end of the engine's front cylinder 32, the remaining valve train components necessary to operate the valves 11' and 13' in proper sequence are installed and operatively connected to the camshaft assembly, including push rods 36 for each valve, only one of such push rods being illustrated. The carburetor 38 is connected through the manifold to the intake port entrance of the cylinder head and the spark plug is installed and operatively connected to the electrical ignition.

For those readers less skilled in engine operation, some additional background should prove helpful to understanding the operation. Considering the operation of one cylinder in a four stroke internal combustion engine, the intake valve opens and the piston is moved downwardly, creating a low pressure, relative to atmospheric pressure, in the combustion chamber above the piston head. Through the intake manifold, a conduit connected to the carburetor, the pressure drop created is signaled to the carburetor output. Consequently, air flows from the high pressure of the ambient to the lower pressure in the engine. The air passes through the carburetor, drawing gasolene vapors out from the carburetor's metering rod, which regulates the flow rate of gasolene drawn into the airstream, creating an air and fuel mixture of the proper proportion for efficient combustion. The mixture is drawn into the cylinder head's intake port and, with the intake valve opening, into the combustion chamber.

In the next stroke the intake valve closes and the piston moves upward compressing the gas within the combustion chamber. Near the end of the piston's upward stroke, the spark plug is ignited, igniting the compressed mixture and creating an explosion in the confined volume.

The force created by the expanding gases in the explosion drives the piston downward, the third stroke in the cycle, and the piston through the piston assembly, in turn, rotates the engine's crankshaft, producing work. During the fourth stroke, the exhaust portion of the cycle, the exhaust valve opens the exhaust port and the piston moves upward and forces the exhaust gases, the products of combustion, out the exhaust port. Due to the high pressure created in the chamber, the exhaust gases flow out of the combustion chamber, the cylinder head and through the engine's exhaust pipe and muffler, and ultimately exit from the tailpipe to atmospheric pressure. The foregoing cycle repeats.

The points at which the valves open and close during the cycle is typically determined by the lobes on a camshaft, which in turn are synchronized to the rotation of the crankshaft driven by the pistons. The point in the cycle at which the spark plug is ignited is synchronized to the rotation of that same crankshaft. In a two cylinder engine, each cylinder operates in the foregoing manner, but the individual cylinders are ignited at different times. For a more detailed explanation of gasoline engine operation the reader is referred to the technical literature.

When the intake valve is open and the piston moves downward, the air fuel mixture is drawn into the combustion chamber as represented by the arrow in pictorial illustration of FIG. 11A. When the piston moves upward, the exhaust gases are expressed through the open exhaust valve as represented in the pictorial illustration of FIG. 11B. When the piston moves upward expressing the exhaust gases through the open exhaust valve, and commences the next stroke, by starting downward movement, the intake valve starts to open, moves slightly off its seat, even though the exhaust valve has not fully closed and remains off its seat, a condition of "low valve lift". This is a point in the cycle referred to as a period of "valve overlap". And it is at this point in the cycle of operation in which reversion, movement of exhaust gases back up through the intake flow path, occurs. This condition is pictorially illustrated in FIG. 11C with both backflowing exhaust gases and air-fuel mixture entering the combustion chamber.

Internal combustion engines are designed to move gas in one direction, through the intake as an air-fuel mixture into the combustion chamber and, following combustion, from the combustion chamber to the exhaust outlet. The period of low valve lift is critical to air flow because this is the period of valve overlap, when both the intake and exhaust valves are simultaneously open. Importantly, reversion causes exhaust gasses to pollute clean air-fuel mixtures, thereby dramatically altering the nature of the combustible mixture and reducing the potential power that would otherwise be obtained from the fuel in the mixture.

Valve overlap is characterized by the period during the combustion cycle in which both the intake and exhaust valves are simultaneously open to a slight degree. That is, the intake valve initially moves toward its full open position, uncovering the inlet port slightly at this point in the cycle, so that the downstroke movement of the piston creates the vacuum to draw air fuel mixture from the carburetor through the inlet, and, simultaneously, the exhaust valve has almost reached its fully closed position whereby the exhaust port at this stage of the cycle is slightly open. As those skilled in the art recognize, valve overlap is a necessary and unavoidable condition inherent in the four stroke engine cycle.

During valve overlap, the different pressure levels present in the intake and exhaust paths are exposed to one another through the combustion chamber. The intake path is closer to the atmosphere and is a lower pressure area. Consequently the exhaust gases, which are at a higher pressure consistent with the greater length of the exhaust path through the exhaust system, the higher pressure created by the fourth stroke in the cycle, and hot expanding gases, naturally reverses its flow and will propagate to the lower pressure region of the inlet. Because exhaust gases have not been completely evacuated from the combustion chamber and because the intake flow of air-fuel mixture to the combustion chamber is constrained by the opposing flow of exhaust gases, the ultimate result is that the engine develops less power than it otherwise could, an effective loss of power.

One is not privileged to be seated within the combustion chamber during the valve overlap period to observe the motion of air-fuel mixture and backflowing exhaust gas. Thus one can only offer a theory as to what actually occurs in the combustion chamber that is responsible for obtaining the improved result observed in practice.

Upon commencement of the engine's intake cycle, the piston is approximately at the top of the main cylinder, at the bottom of the cylinder head, where the piston forms essentially a floor to the combustion chamber. The intake valve face is moved off the seat along the valve axis, into the chamber, creating an annular passage through which the air fuel mixture flows into the chamber. The piston starts downward movement in the cylinder, creating the vacuum, the low pressure that draws the air-fuel mixture through the intake port, now opening. In that position, referencing the pictorial illustration of FIG. 4, the volume at x' and about the angle B, bordered by the near the vertical chamber wall, which shrouds the inlet port 5, adjacent the inlet port is quite small, while that volume or region FR1, referred to as the flow relief region, besides another portion of that intake port, bounded by the gradually curved chamber wall spaced at a greater distance from that port, is relatively large.

As the air-fuel mixture is drawn through the intake port into the chamber, any flow of that mixture in the direction of the shrouded side of the port quickly builds up a higher pressure or restriction that essentially obstructs or limits the flow of the gaseous air-fuel mixture along that side of the combustion chamber in the presence of the unobstructed lower pressure flow relief region, FR1, on the opposed side, which offers an easier flow path to the gas mixture. The air-fuel mixture, not unexpectedly, is induced thereby to in great part flow toward the flow relief region FR1; and the mixture may be said to be diverted to that side. Further inasmuch as the chamber wall at that side is gradually vertically sloped, along the vertical direction, as well as curved, along the horizontal direction, forming essentially a curved ramp, the gas mixture, in propagating along such a ramp is induced to circumferentially swirl about the chamber. That swirling action effectively increases turbulence of the mixture in the combustion chamber, which is desired for better combustion. Moreover, while gas propagation on the shrouded region of the valve is limited, a limited portion of the gas mixture is drawn up the steep vertical wall, characterizing the shrouded region of the port, causing that gas to vertically tumble. That vertical tumbling action also increases desired turbulence in the mixture. It is noted that some of that mixture may also flow from the intake port directly to the right, which does not appear to adversly affect operation.

Further considering the piston in that same position in FIG. 4, the region at y' and that bordered by the near vertical chamber wall, about angle C, which is said to shroud the exhaust port, is quite small, while that flow relief region FR2 on the other side of the exhaust port, say at y', is relatively large, bounded by the gradually curved wall a greater distance from that port which leaves that portion of the exhaust port unshrouded. The disk shaped exhaust valve face is moving along the valve axis toward the valve seat. During the valve overlap period, the exhaust port opening is reduced in size to a thin annular passage formed between the circular exhaust port and the disk shaped valve face. Any backflow of exhaust gas, during the valve overlap period when the exhaust and intake valves are slightly open, in the direction of the shrouded side of the exhaust port finds a higher resistance path and quickly builds up pressure that inhibits gas flow. That minimizes exhaust gas flow along that side of the exhaust port in the presence of the unobstructed lower pressure region FR2, on the other side of the port, which offers a lower resistance path. The exhaust gas is induced thereby to flow toward the flow relief region FR2 and may be said to be diverted to that side.

Further, for the exhaust gas to reach the intake port under conditions of turbulence, the exhaust gas encounters the same conditions faced by the air-fuel mixture being inputted. Only in this situation the unshrouded side of the inlet valve, FR1, is located on the other side of the combustion chamber, to the left side in the figure, essentially diagonally across the chamber. Hence, such exhaust gas propagates at least partially in a path that goes to one side of the chamber, region FR2, then across the chamber to the other side and region FR1 before the gas reaches the inlet valve. Some of the exhaust gas may of course travel directly between the valve ports, but this phenomenon is believed minimal at best. Otherwise one would not attain the improved engine performance observed.

Extending the length of the path that any backflowing exhaust gas must travel to reach the inlet port, increases the time it takes to reach the inlet port. Considering that the valve overlap period is very short, increasing the length of the path of propagation between exhaust and intake ports for backflowing exhaust gas, would thus appear to have the effect of reducing the effect of backflowing gas or inhibits such backflow. That is, such increased path length reduces reversion. Such is borne out in the improved results of engine operation.

An additional theoretical basis for the improved result may be that it is the combination of the increased turbulence to the air-fuel mixture on the one hand and the increased obstruction of backflow of exhaust gas is responsible for the improved result. The latter obstruction may be such that the increased path of travel creates an effective high resistance to flow as presented to exhaust gas that seeks to backflow, minimizing the quantity that backflows, generally leaving the air-fuel mixture unaffected from the optimum ratio for combustion.

An additional feature to the cylinder head includes an intake port 5 that is of a rectangular shape in cross section at the entrance to the head as best illustrated in FIG. 9, and earlier shown in FIGS. 1 and 3. The generally rectangular geometry of the air-fuel intake port entrance is oriented essentially "tilted up" slightly in position relative to the plane defined by the bottom machined surface 15 of the cylinder head, leaving one of the four corners of that rectangle, the lower left corner in this figure, in a lower vertical position than the remaining three corners of that rectangle. However, the end of that conduit located at the combustion chamber wall, is circular in section, as earlier described. As shown in FIG. 9, the bottom side or "floor" of that intake port is preferably oriented perpendicular to the intake valve axis, the latter of which extends centrally through the intake valve stem guide that is visible through the port opening in the figure.

According to accepted design principals, air flows naturally to the point of lowest pressure by the shortest distance. It is found that air flows more naturally at the bottom, referred to as the floor, of an air conduit as that is the shortest path by which the gas can flow to equalize the pressure differential. With the rectangular shape, the surface area of that floor is maximum and, according to the present theory, should result in an air flow increase in both the quantity and velocity of air flow. And with the floor oriented perpendicular to the intake valve centerline, it is believed that a more even and consistent air flow results. Again making reference to FIG. 3, it is recalled that the view of air-inlet port 5's entrance in that figure lies in the plane, perpendicular to the sheet, represented by the straight line shown to the left, that angles downward and outward, and cuts perpendicularly across the left portion of line 7—7. As represented by the upward slope to the left portion of line 7—7, that entrance face or plane is oriented at an angle of somewhat less than 90 degrees to another, second, plane that extends through the center of valve guides 26 and 28, as represented by the mid-portion of line 7—7. In FIG. 3, that angular displacement from the perpendicular measures about nineteen degrees. Referring again to FIG. 9, the intake valve guide is oriented perpendicular to the floor, the bottom side of the rectangular entrance, shown tilting slightly upwardly. And, as illustrated, the valve guide appears essentially centrally located relative to that bottom side.

The rectangular intake port contains a short side radius crown, illustrated at 31 in FIG. 7. That crown is higher and wider than the prior round designs could provide, given the same cross section area. The short side crown is the point in the cylinder head at which the incoming air-fuel mixture must turn and enter the combustion chamber. With the foregoing design the crown 31 is located further away from the combustion chamber, as compared with the lower and shorter crowns typical of prior head designs, which all use the circular shaped intakes. Because of the increase in distance from the combustion chamber to the intake crown, the low pressure "signal" or impulse transmitted from the atmosphere must travel a longer distance, which, according to the present theory, further obstructs or minimizes the negative effect of reversion. Moreover the taller radius crown creates essentially a ninety degree turn in the gas transmission path, illustrated as E, in contrast to the bend created along the centerline of the conduit, illustrated at D, which is less than ninety degrees. That ninety degree turn at the crown is also is believed to help isolate the low pressure area, F in FIG. 7, created within the intake runner. This lower pressure region further encourages the air fuel mixture to take a sharp turn, thereby increasing flow velocity.

FIG. 12 illustrates a novel intake manifold 35, that is preferably used with the invention. Manifolds provide the conduit through which the air fuel mixture passes from the carburetor to the cylinder head. The intake manifold is of a T-shape, with the principle stem 38 for connection to the carburetor and the top of the T having an outlet 37 for connection to each of the two cylinder heads of a big twin-V engine. The geometry of the carburetor connection is the same as the outlet for the carburetor employed in the assembled engine. As shown outlet 37 is of a rectangular shaped cross section to mate with the intake port entrance 5 of the cylinder head, as illustrated in FIG. 9. The other outlet is of like geometry. In alternative embodiments of the intake manifold, other carburetor attachment flanges may be substituted for that illustrated.

The preferable relationship between the manifold and the intake port entrance is such as to form a straight line path between the carburetor and the intake port, essentially the entrance to the intake port being coaxial with the axis of the manifold. That relationship further enhances air flow of benefit to engine operation.

In a practical embodiment of the improved cylinder head, the head is formed of 356 aluminum in a conventional casting process and treated to T6 hardness. The casting is then drilled and machined to required dimensional tolerances. In addition to the combustion chamber details earlier described, the combustion chamber for the practical embodiment has a volume of 72 cc, which equates to a compression ratio of 9.5:1, when used with the stock bore stroke and 0.045 inch cylinder head gasket. That is a decrease from the 82 cc volume of the Harley stock big V-twin head and an increase from the 8.5:1 compression ratio of that stock engine. The floor of the intake port is 0.125 inches higher than on a stock Harley head. The ports are left in cast condition. The intake valve is 1.850 inches in diameter, made of stainless steel and is swirl polished. The airflow of the intake port is rated at 245 CFM at 28 inches of water pressure and 0.600 inches of valve lift.

The exhaust valve is 1.610 inches in diameter, is formed of stainless steel and is swirl polished. Flow figures for the exhaust port are 200 cfm at 28 inches of water pressure and 0.600 inches of valve lift. Intake and exhaust valves use two-piece springs. Teflon brand valve stem seals are also installed. The valve springs are held in place by lightweight chrome-moly retainers and machined locks. The springs are set up to handle cams of up to 0.600 inches of valve lift. The valve seats are formed of ductile iron. The foregoing details are in addition to the details earlier given at various locations within this specification.

As one appreciates, the cylinder head contains familiar elements and is assembled to the engine either by the engine manufacturer as original equipment or by others as a substitute for the stock cylinder head that is supplied with the engine. As example, the practical embodiment illustrated is intended as a replacement for a cylinder head supplied in the Harley Evolution V-twin engine. In the practical embodiment described containing the unique combustion chamber, the rectangular shaped intake entrance and the D-shaped exhaust exit, a ten per cent gain in peak torque and horsepower was achieved over that available from the stock Evolution big V-twin engine. This is regarded as a significant advantage in performance.

It is appreciated that the invention is characterized by somewhat complicated geometric shape to the combustion chamber, in silhouette resembling the torso of a lopsided showman, that minimizes reversion and promotes turbulence. Since the geometry does not appear to be of a known mathematically defined shape or other common shape as might be found in one's dictionary, a description of that geometry and its relationship to the intake and outlet ports is thereby difficult to express, as is customarily required for the patent claims. The claims appended to this specification, may in some instances require description of imaginary figures, such as planes, and reference the elements to such imaginary figures as should permit one's intellect to paint the geometrical relationships important in the practice of the invention. Even so, it is likely recognized by the engineer and others skilled in the art who wish to practice the invention, that the complicated preferred geometry is best described by the detailed illustrations of FIGS. 3, 4, 5 and 6.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a cylinder head, an air-fuel intake conduit for conveying air-fuel mixture from a carburetor to a combustion chamber located within said cylinder head, said cylinder head including a bottom flat surface bordering said combustion chamber for abutting a cylinder block, an intake valve stem guide, located in said combustion chamber, for guiding an intake valve, and an exhaust valve stem guide, located in said combustion chamber, for guiding an exhaust valve; comprising:

- an entrance to said conduit located on the exterior of said cylinder head, said entrance being of a rectangular geometry containing four corners;
- an intake port opening to said conduit, said intake port opening being located in said combustion chamber, said intake port opening being of a circular geometry;
- said entrance defining a first plane, with said first plane being oriented upstanding relative to said bottom flat surface, and said intake port opening defining a second plane with said second plane oriented at an angle to said first plane;
- said intake and exhaust valve stem guides defining a third plane through the centers thereof; said first plane defined by said entrance being oriented at a predetermined angle from the perpendicular to said third plane;
- a conduit extending through said cylinder head between said entrance and said intake port opening, said conduit including:
  - a transition between a rectangular geometry to a circular geometry and
  - a bend for defining a curved path through the center of said conduit, said curved path encompasing a predetermined change in angular direction between said entrance and said intake port opening of less than ninety degrees, whereby air-fuel mixture flowing through the center of said conduit undergoes a change of direction of greater than ninety degrees; and
  - a crown in the floor of said conduit proximate said entrance, said crown extending into said conduit for reducing the internal cross section of said conduit and for defining a path along said floor that provides a smooth transition of ninety degrees between said entrance and said intake port opening, whereby air fuel mixture flowing along said floor undergoes a change in direction of ninety degrees;
- said entrance being oriented with one of said four corners oriented lower in position, relative to said bottom flat surface, than the remaining three corners, and a second one of said four corners being next lower in position; said one and said second one of said four corners defining two ends of a floor to said entrance; and
- said air-fuel intake valve guide being oriented perpendicular to said floor.

* * * * *